United States Patent [19]

Barham et al.

[11] Patent Number: 5,737,372
[45] Date of Patent: Apr. 7, 1998

[54] APPARATUS FOR SYNCHRONIZING MULTIPOINT-TO-POINT COMMUNICATIONS SYSTEMS

[75] Inventors: Steven Todd Barham; Samuel Charles Kingston, both of Salt Lake City; John Walter Zscheile, Jr., West Farmington, all of Utah

[73] Assignee: Unisys Corporation, Blue Bell, Pa.

[21] Appl. No.: 503,955

[22] Filed: Jul. 19, 1995

(Under 37 CFR 1.47)

[51] Int. Cl.[6] .................................................. H04L 7/00
[52] U.S. Cl. .......................... 375/367; 375/200; 327/156
[58] Field of Search ........................... 375/200, 205, 375/259, 356, 371, 373, 375, 376, 367; 327/156, 141; 364/724.03; 370/503, 514, 515, 516

[56] References Cited

U.S. PATENT DOCUMENTS

| | | | |
|---|---|---|---|
| 4,110,557 | 8/1978 | Huber | 375/375 |
| 4,879,674 | 11/1989 | Iijima et al. | 364/724.03 |
| 5,060,180 | 10/1991 | Kingston et al. | 364/724.03 |
| 5,103,459 | 4/1992 | Gilhousen et al. | 375/200 |
| 5,111,478 | 5/1992 | McDonald | 375/371 |

*Primary Examiner*—Stephen Chin
*Assistant Examiner*—Bryan Webster
*Attorney, Agent, or Firm*—John B. Sowell, Esq.; Mark T. Starr, Esq.; Steven B. Samuels, Esq.

[57] ABSTRACT

In a spread spectrum multipoint-to-point communication system there is provided a novel frequency to phase converter, for automatically synchronizing the PN codes of the user transmitters/receiver with the receiver/transmitter in the central hub. The highly accurate frequency to phase converter generates a highly accurate phase error signal for synchronizing the multiuser network. The frequency to phase converter includes a serial adder and a series to parallel converter and a shift register which integrates the highly accurate phase error signal values and produces a highly accurate frequency value which is applied to the input of the resident processor in the central hub transmitter/receiver. The central hub transmitter/receiver calculates the clock offset for synchronizing each of the user receiver transmitters and generates a clock adjusting signal which is transmitted to the user receiver/transmitters.

10 Claims, 5 Drawing Sheets

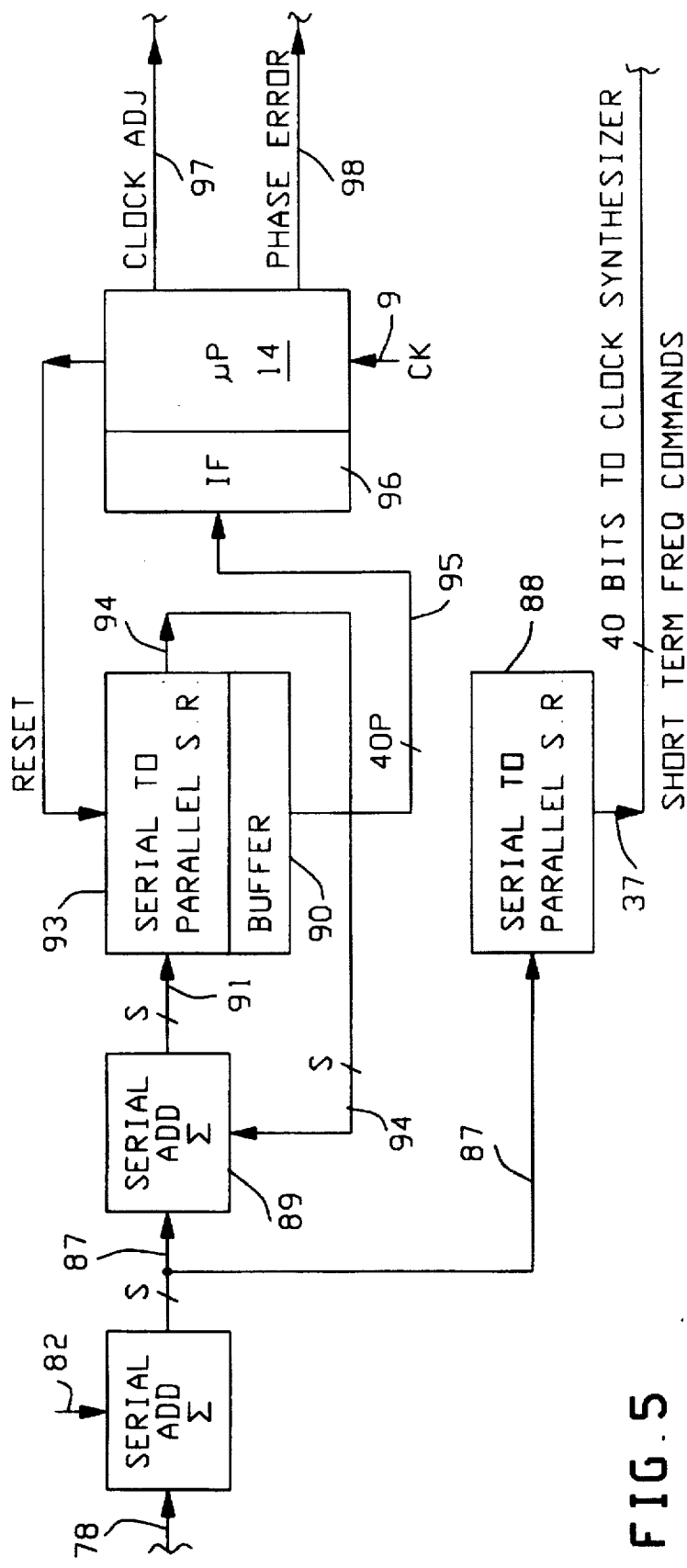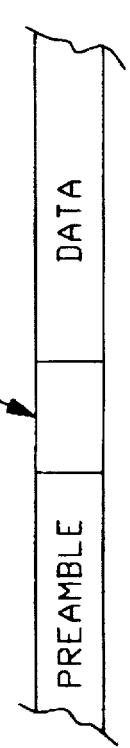
FIG. 5
FIG. 6

APPARATUS FOR SYNCHRONIZING MULTIPOINT-TO-POINT COMMUNICATIONS SYSTEMS

BACKGROUND OF THE INVENTION

1. Field of the Invention

The present invention relates to wireless spread spectrum communications systems. More particularly, the present invention relates to an apparatus for synchronizing spread spectrum multipoint-to-point communications systems for greatly increasing the number of users in a given bandwidth which increases the capacity of the system.

2. Description of the Prior Art

Wireless communication systems for transmitting digital data are known and the trend of the future is that digital communication systems will substantially replace analog systems because of the greater capacity of the number of users that can be simultaneously accommodated on an allocated bandwidth. Further, digital systems are substantially cheaper than the analog systems.

Time division multiple access (TDMA) is known and widely used to increase the number of users on an allocated digital bandwidth or channel.

Code division multiple access (CDMA) is known and is increasingly being used in applications where improved performance can be achieved over analog systems for TDMA wireless communication systems.

It is known that in both TDMA and CDMA communications systems, that the maximum theoretical system capacity is only achieved when the whole communication system is synchronized to a common master or reference clock. The equipment presently used to synchronize TDMA and communication system are external to the receivers and transmitter used in the system, thus, when employed create an added cost to the basic transmitter/receiver system.

It would be highly desirable to provide an extremely simple and highly accurate pseudo noise (PN) code phase error detector and logic circuits for synchronizing a multipoint-to-point network that could be embodied in the demodulator chips used in transmitter/receivers.

SUMMARY OF THE INVENTION

It is a principal object of the present invention to provide a code phase error detector circuit that is highly accurate and provided in a digital demodulator at no additional cost.

It is principal object of the present invention to provide a code phase error detector circuit that supplies accurate phase error data to an existing demodulator and computer system in a simple central hub receiver for generating clock adjustment signals.

It is a principal object of the present invention to provide a clock error system for calculating phase error between a central hub receiver and multiple user receiver/transmitters and for generating signals for remotely adjusting the phase error in the clocks of the multiple users receiver/transmitters.

It is a principal object of the present invention to provide a phase error system capable of being added into a commercially available Direct Sequence Spread Spectrum (DSSS) demodulator chip used in digital transmitter/receivers.

It is a principal object of the present invention to provide a novel demodulator/synchronizer for decreasing guard time in TDMA communication systems, thus, increasing capacity.

It is a principal object of the present invention to provide a novel demodulator synchronizer for improving the timing accuracy of PN codes which results in increasing the orthogonology and thus, the capacity of the synchrony of CDMA communication systems.

According to these and other objects of the present invention, there is provided a digital demodulator in the receiver of a central hub transmitter/receiver which communicates with a plurality of user receiver transmitters in a multi-node point-to-point communication system. Each of the user receiver/transmitters is synchronized by and with the central hub transmitter/receiver. A code phase error system in the central hub transmitter/receiver generates a digital phase error signal employed to generate a plurality of frequency error signals. A resident processor in the hub transmitter/receiver processes the frequency error signal information to produce individual PN code adjusting signals which are transmitted to the user receiver/transmitters and used to synchronize their transmitters with the central hub.

BRIEF DESCRIPTION OF THE DRAWINGS

FIG. 5 is a detailed schematic block diagram of a preferred embodiment pseudonoise (PN) frequency-to-phase converter in the hub receiver for synchronizing a multi-user network; and FIG. 6 is a schematic drawing of a data stream generated by a central hub transmitter employing the clock adjusting information produced by the phase converter shown in FIG. 5 for synchronizing the user receiver/transmitters.

DESCRIPTION OF THE PREFERRED EMBODIMENTS

Figure 1:
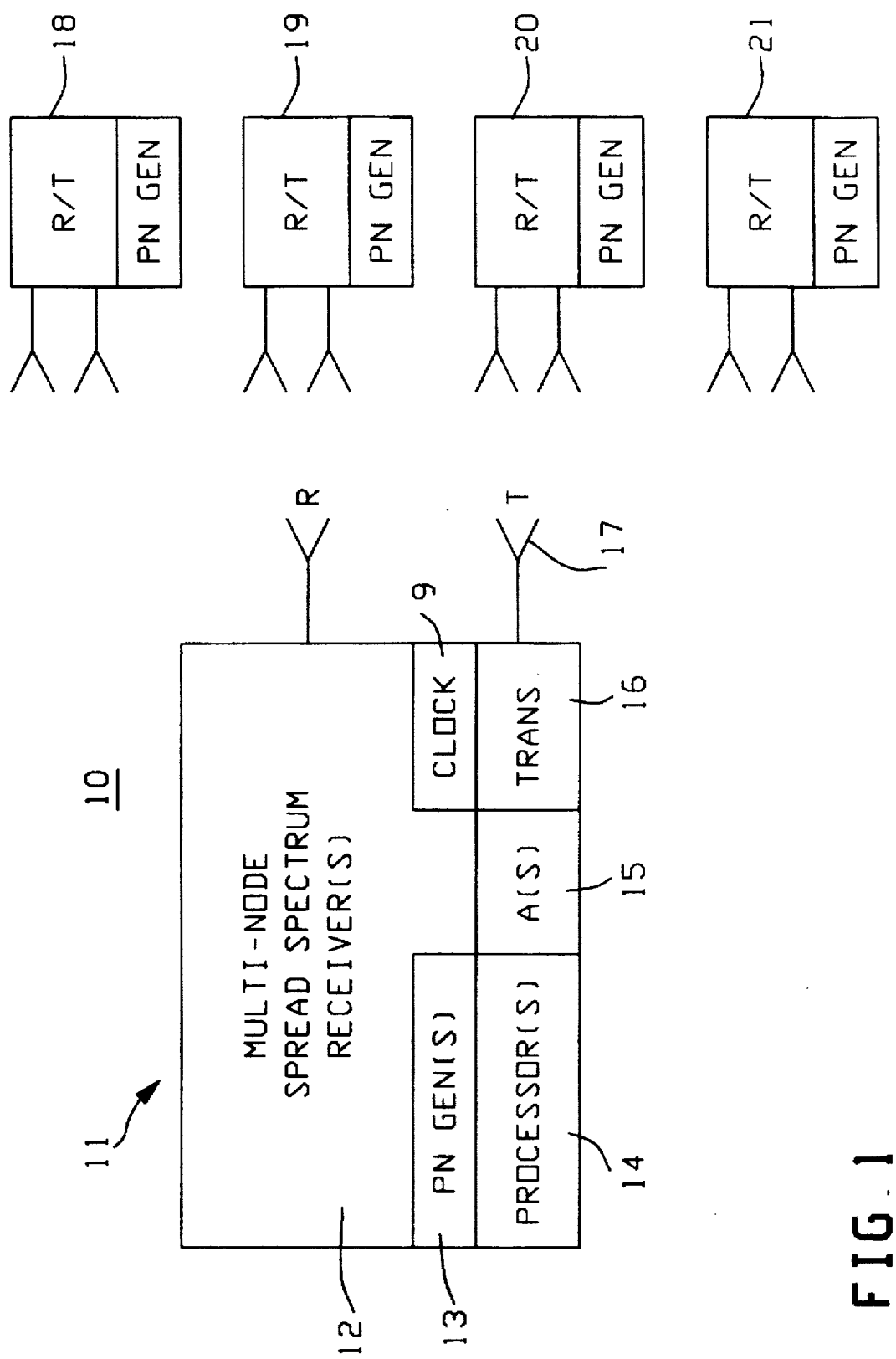
FIG. 1 is a schematic block diagram showing a synchronous spread spectrum multipoint-to-point communication system.

Refer now to FIG. 1 showing a synchronous spread spectrum multipoint-to-point communication system 10 which comprises a central node or hub transmitter/receiver 11 which comprises a receiver 12, PN generators 13 and processors. 14. The signals processed are amplified in amplifiers 15 and transmitted by transmitters 16 on transmitter antenna 17. It will be understood that in the preferred embodiment of the present invention, the plural PN codes are being transmitted in the same bandwidth. Signals transmitted on antenna 17 are received by a plurality of user receiver/transmitters 18 through 21 each of which has its own PN generator operating with a unique PN code.

The receiver/transmitters 18 to 21 each have oscillators which cannot be perfectly tuned to the same frequency and have PN generators which are unique to the individual user transmitter/receiver. Since the receiver/transmitters 18 to 21 are generally located at different locations and have unique oscillator frequencies, the transmitted signal to the central node or hub 11 will be arriving at different times. In order to optimize the capacity of the spread spectrum system 10, it is desirable to synchronize the PN generators in the user receiver/central node or hub 11. It was known in the prior art that synchronizing the system 10 would increase the capacity of the system. Heretofore, the practice was to provide external equipment at the central hub transmitter/receiver which monitored the incoming signals from the individual transmitter/receivers 18 to 21 and made time difference offset measurements which were communicated back to the receiver/transmitters 18 to 21 which required further external equipment to make the appropriate adjustment. When the receiver/transmitters 18 to 21 are low cost portable terminals, it is virtually impossible to make the aforementioned adjustment with external equipment.

Figure 2:
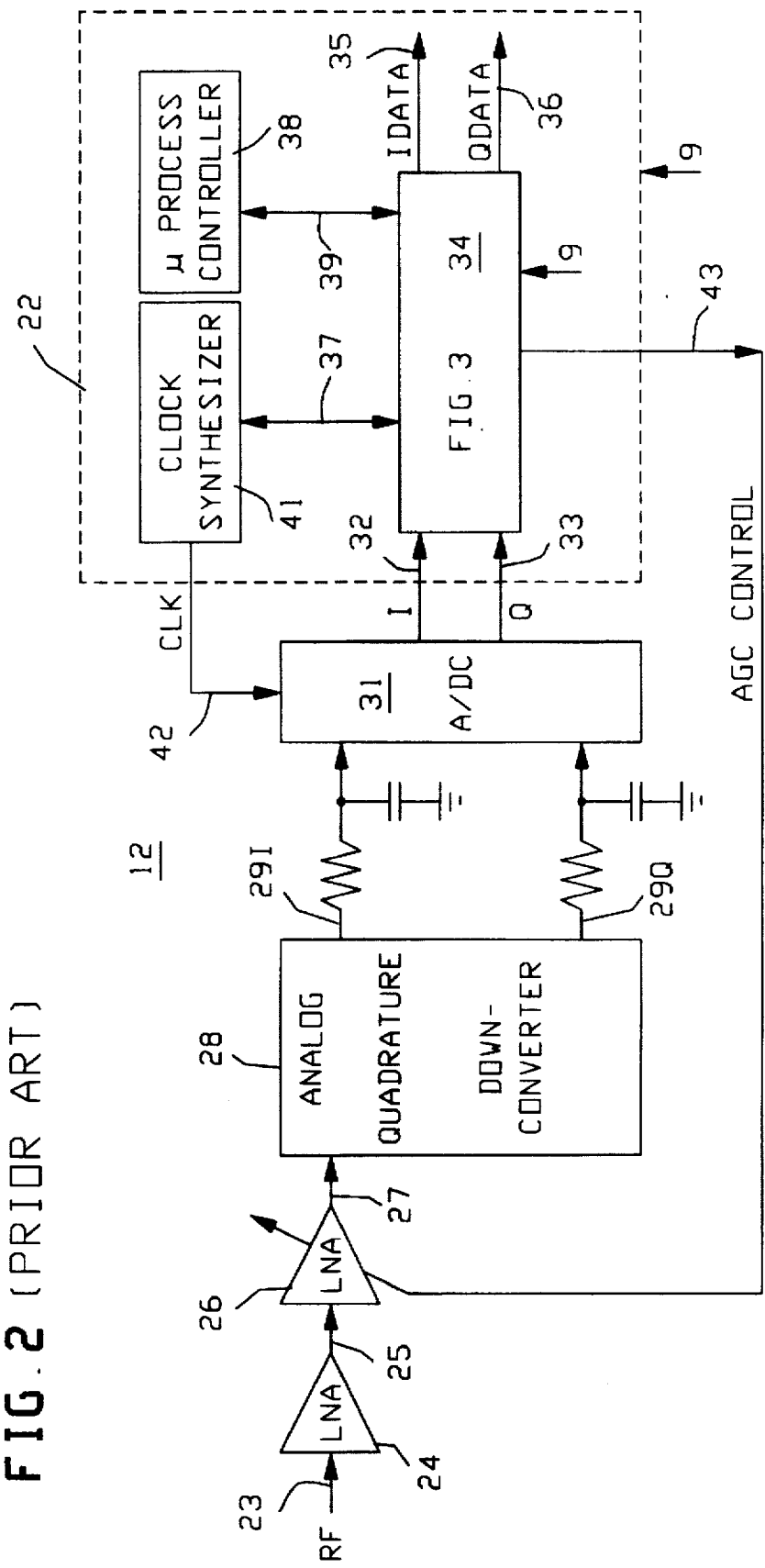
FIG. 2 is a schematic block diagram of a prior art commercially available digital spread spectrum demodulator system.

Refer now to FIG. 2 showing a schematic block diagram of a prior art spread spectrum receiver system 12 which incorporates therein a digital spread spectrum demodulator 22. The receiver 12 and demodulator 22 are shown and described in our U.S. Pat. No. 5,060,180 issued 22 Oct. 1991 and is incorporated herein by reference thereto. The signal on line 23 is the RF signal in the receiver 12 which is applied to a low noise amplifier 24. The output of the low noise amplifier 24 on line 25 is applied to an automatic gain control 26. The output of the gain control on line 27 is applied to a quadrature down converter 28 which provides an in phase and quadrature phase output on lines 29I and 29Q respectively. The in phase and quadrature signals are filtered and applied to a analog to digital converter 31 to produce in phase and quadrature digital samples on lines 32 and 33 respectively. The digital samples on lines 32 and 33 are applied to the FIG. 3 digital Chip 34 of the digital demodulator system 22. The digital demodulator chip 34 is shown providing I data and Q data digital outputs on lines 35 and 36 respectively. Demodulator chip 34 produces a digital command signal on line 39 that communicates with a microprocessor 38 via a command and status bus 39. A frequency error command signal on line 37 is applied to a clock synthesizer 41 which produces a desired recovered clock on line 42. Further, a control signal on line 43 from the demodulator chip 34 is applied to the automatic gain control 26.

Figure 3:
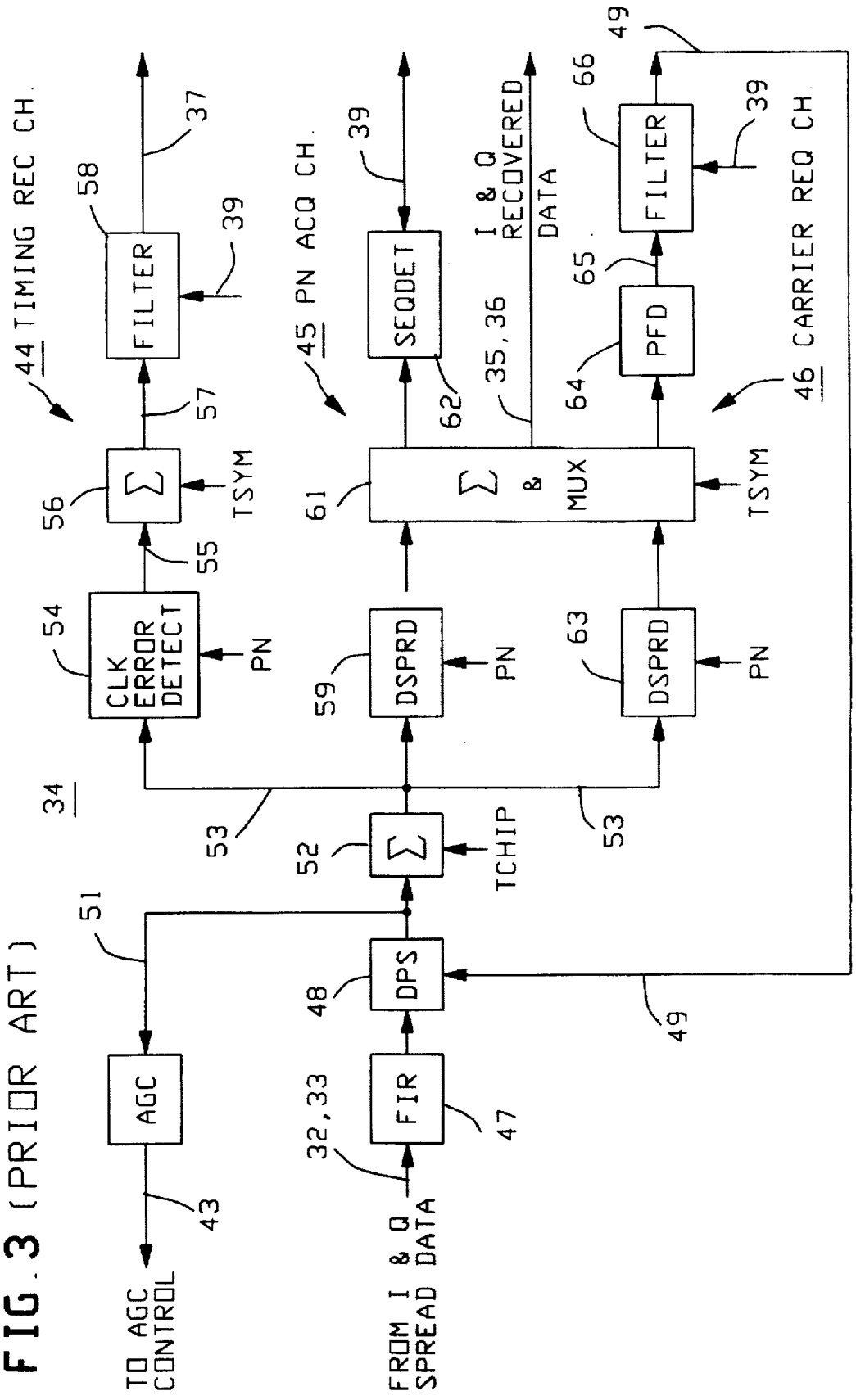
FIG. 3 is a more detailed schematic block diagram of a portion of the digital demodulator of the system of FIG. 2 showing a timing recovery loop having a digital programmable loop filter.

Refer now to FIG. 3 showing a more detailed schematic block diagram of a portion of the digital demodulator chip 34. The demodulator chip 34 is shown having the aforementioned inputs on lines 32, 33 and an output on line 43 to the automatic gain control. Basically, the schematic drawing of the demodulator chip 34 comprises a timing recovery channel 44, a PN acquisition channel 45 and a carrier recovery channel 46. The signals on lines 32, 33 are applied to a finite response filter 47 and the output therefrom is processed in a digital phase shifter 48 which is adjusted and controlled by a carrier phase command signal on line 49 to produce a digital output on line 51 that is applied to an accumulate and dump circuit 52. The output of the accumulate and dump circuit 52 is applied via line 53 to the aforementioned three channels 44, 45 and 46. The coherent digital data signal on line 53 is applied to a clock error detector 54 in channel 44. The output of the error detector 54 on line 55 is applied to a second accumulate and dump circuit 56 to provide an accumulated clock error signal on line 57 which is applied to digital filter 58 which will be described in greater detail hereinafter. The digital filter 58 produces the aforementioned frequency command signal on line 37 to control the clock synthesizer as described hereinbefore.

In similar manner, the digital data signal on line 53 is applied to the elements of the PN acquisition channel 45 which comprise the despreader 59, multiplexer element 61 and sequential detector 62 to produce a control signal on output line 39. In similar manner, the coherent data signal on line 53 is applied to a second despreader 63 and its output is applied to the multiplexer 61 having an output which is applied to a carrier phase detector 64. The output of the phase detector on line 65 is applied to a digital filter 66 which produces the carrier phase command signal on line 49. It will be noted that the digital filters 58 and 66 are constructed substantially the same, however, for purposes of the present invention the digital filter 58 in the timing recovery channel 44 will be described in greater detail hereinafter to provide the foundation and signals used for the present invention novel frequency to phase converter.

Figure 4:
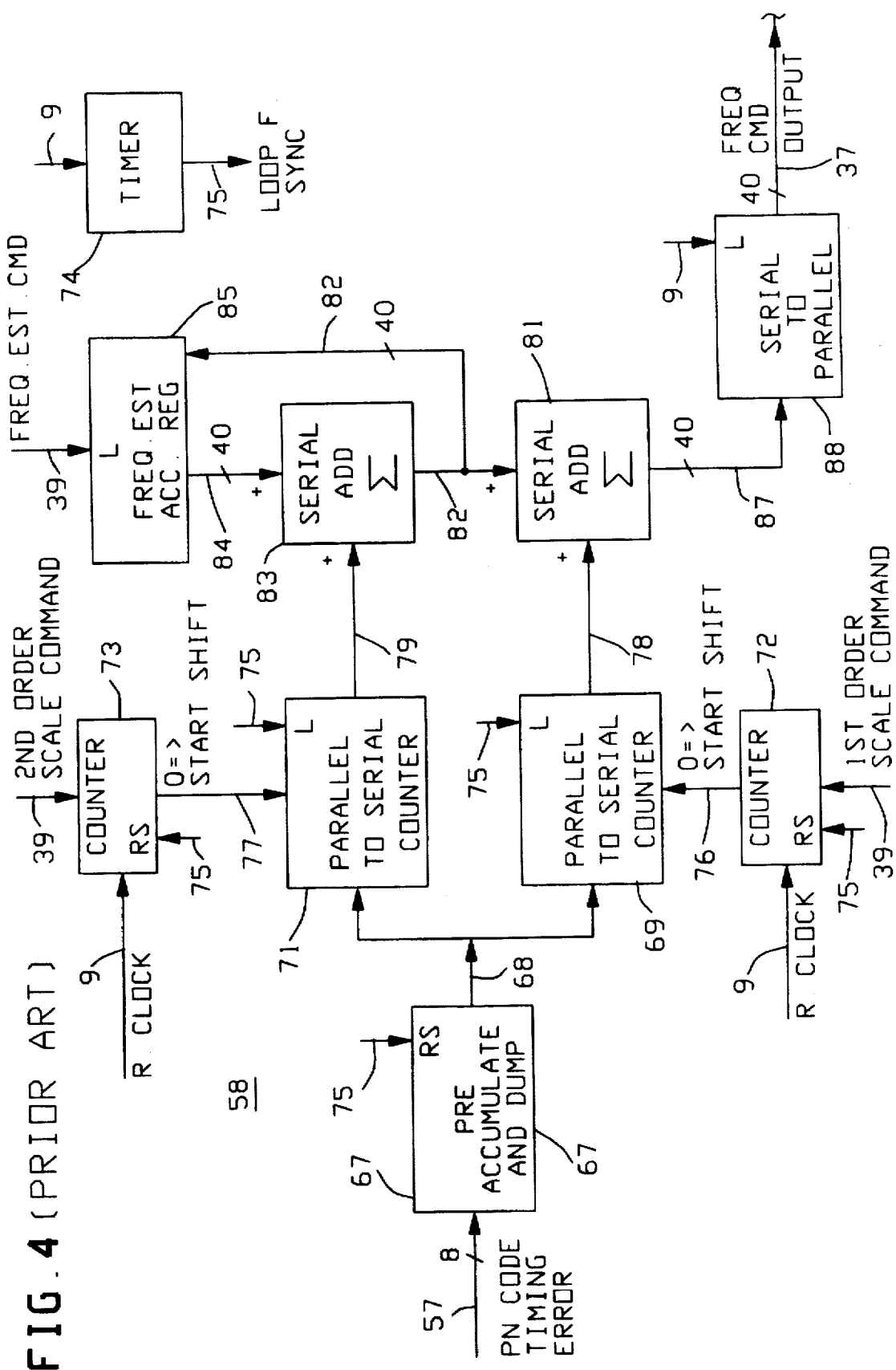
FIG. 4 is a detailed schematic block diagram of a preferred prior art digital programmable loop filter which processes the timing error signal generated in the timing recovery loop of the timing recovery loop shown in FIG. 3.

Refer now to FIG. 4 showing a detailed schematic block diagram of a preferred embodiment digital programmable loop filter 58 of the type shown and described in the aforementioned U.S. Pat. No. 5,060,180. The PN error signal on line 57 is applied to a preaccumulate and dump circuit 67 which is synchronized by a filtered sync signal on line 75 to produce an output on line 68 which is applied to a pair of parallel to serial counters 69 and 71. The parallel to serial converter counters 71 and 69 are shown having programmable inputs 76 and 77 each of which comprise presettable counters 72 and 73 shown having respective first order scale command inputs 39 and second order scale command inputs which are programmable from the aforementioned processor 14. The presettable counters 72 and 73 are supplied with system clock inputs on lines 9, loop filter sync inputs on lines 75 which restart the counters 72 and 73 respectively. The output of the first order counter 72 on line 76 delays the output to the parallel to serial converter 69 while the preset count is counting down to zero and starts the serial output at the count of zero on line 78. Similarly, the output on line 77 delays the output of the counter 73 until the count of zero is reached and starts the counter 73 until the count of zero is reached and starts the shifting of the information to its output line 79. The effect of delaying the start of the shifting out of the data in the converters 69 and 71 is to multiple the output data by a power of 2 for each of the shift positions.

A first programmable one bit serial adder 81 is shown receiving digital bit information on line 78 and 82. The second input on line 82 is from a second programmable 1 bit serial adder 83. The second serial adder 83 receives bit information on line 79 and a 40 bit programmable input on line 84 from a programmable accumulator register 85 which has a microprocessor frequency estimate command input on line 39 and a serial data input from line 82. The second order stage receives a frequency estimate command on line 39 which is loaded into the frequency estimate accumulator register 85 and presented as a serial 40 bit output on line 84 to a positive input of the second order serial adder 83. The output of the second order serial adder 83 on line 82 is recirculated back on line 82 as a part of the accumulation and is also provided as an input to the first order serial adder 81. The output of the first order serial adder 81 on line 87 is applied to a serial to parallel converter 88 to produce a 40 bit highly accurate parallel filter output signal on line 37 as described hereinbefore as a frequency command or the error signal.

There is further shown a 40 bit step down counter circuit 74 which has a reference clock input 9 and produces at its output the aforementioned loop filter synchronizing signal on line 75.

Refer now to FIG. 5 showing a detailed schematic block diagram of a preferred embodiment pseudo noise (PN)

frequency phase converter in the receiver 12 for synchronizing a multiple user network. The aforementioned serial adder 81 is shown having an output on line 87 which second serial adder 89 on line 91 is applied to a serial to parallel converter 93 employing a shift register and buffer 90. The output of the converter 93 on line 94 is recirculated back to an input of serial adder 89 via line to produce an accumulator. The parallel output of buffer 90 on line 95 is the integrated phase error of the signal being received in the receiver 12. The 40 parallel bits on line 95 provide a highly accurate filtered low noise phase error signal which is applied in bits or bytes to an interface 96 of an aforementioned microprocessor 14. If a separate processor is employed, the processor must employ a synchronizing clock signal on line 9.

A feature of the of the present invention is that the processor 14 of FIG. 5 is programmed to take the integrated frequency output from converter 93 as a phase value and use the phase value or values to compute a desirable clock adjustment signal. The clock adjustment signal on line 97 may then be applied to the amplifier 15 and transmitter 16 and transmitted via antenna 17 to the user receiver/transmitters which employ the information in an automatic mode to synchronize and adjust their clocks to the PN generator clock in the receiver 12 of the central node or hub transmitter/receiver 11. The phase error signal on line 98 is generated in the microprocessor 14 while calculating the clock adjustment signal on line 97. The phase error signal on line 98 is also available for ranging purposes and other types of calculations.

The serial adder 81 shown and described with reference to prior art FIG. 4 provides a highly accurate serial output on line 87 which is applied to the aforementioned serial to parallel converter 88 to produce the frequency command signal on line 37 as explained hereinbefore. This short-term frequency command signal is used to maintain the clock synthesizer 41 in the receiver 12 in sync with the received signal.

Refer now to FIG. 6 showing a drawing of the data stream generated by the central node or hub transmitter 11 employing the clock adjust information produced by the converter 39 shown in FIG. 5. The clock adjustment signal on line 97 appears as clock adjustment bits in the data stream between the preamble and the data being supplied to the user receiver/transmitters 18 to 21. The manner in which this information is employed at the receiver/ transmitters is well known and it is used to make the proper adjustment of the PN generators in the transmitter 18 to 21, thus the synchronized output signals from the receiver/transmitters 18 to 21 arrive at the receivers 12 of the central node or hub 11 system 10 completely synchronized with the master clock in the hub.

Having explained a preferred embodiment of the present invention, it will be appreciated that it is now possible to synchronize a spread spectrum multipoint-to-point communications system without incurrence cost or any maintenance time since the operation is carried out automatically. By maintaining this very high degree of synchronization in TDMA and CDMA systems, it will be understood that the capacities of either or both systems have been greatly increased. For example, compared to an unsynchronized CDMA system, the synchronization of the CDMA system using the present invention provides an increased capacity of two to three times.

As a further example, it will be appreciated that in a synchronous CDMA system having a processing gain of 100, it would be possible to increase the number of users in a single channel from approximately 30 to 60 to 90 users.

What is claimed is:

1. A code phase error system for generating code adjustment signals for use by multi-user receivers in a synchronized spread spectrum multipoint-to-point communication system, comprising:

a. a central hub transmitter/receiver,
   b. a plurality of user receiver/transmitters for maintaining wireless communications with said hub transmitter/receiver,
   c. a digital demodulator in said central hub transmitter/receiver for receiving PN encoded information from the user transmitters,
   d. said digital demodulator having a phase error detector which includes a programmable digital filter,
   e. said programmable digital filter comprising a serial adder having a highly accurate digital phase error signal output,
   f. a frequency to phase converter coupled to an output of said serial adder,
   g. said frequency to phase converter comprising means for processing said highly accurate digital phase error signal to provide a plurality of highly accurate phase error values, and
   h. processor means coupled to said frequency to phase converter in said digital demodulator for calculating a digital clock adjustment signal to be transmitted to each of said user receiver/transmitters by said central hub transmitter/receiver,
   i. said code phase error system being programmed to calculate the phase offset of the received PN coded data and for adjusting each of the user transmitters until highly synchronized with the PN code generated in said central hub transmitter/receiver.

2. A code phase error system as set forth in claim 1 wherein said processing means comprises a circuit for integrating frequency error values to produce said phase error values.

3. A code phase error system as set forth in claim 2 wherein said circuit comprises, a serial adder having a first input coupled to receive said highly accurate digital frequency error signal, and
   a serial accumulator coupled to the output of said serial adder and having an output coupled as a second input to said serial adder.

4. A code phase error system as set forth in claim 3 wherein said accumulator comprises a serial to parallel shift register.

5. A code phase error system as set forth in claim 4 which further includes a buffer register in said serial to parallel shift register coupled to an interface of said processor means, said processor means being programmed to generate a clock adjust signal for synchronizing the PN generator in said plurality of user receiver/transmitters with the PN generator in said central hub transmitter/ receiver.

6. A code phase error system as set forth in claim 5 wherein said processor means is programmed to generate a plurality of clock adjustment bits for either gross or fine adjustment of said PN generator in said user receivers.

7. A method of synchronizing a spread spectrum multipoint-to-point communications system comprising the steps of:

providing a digital demodulator in the receiver of a central hub transmitter/receiver, receiving individual user PN modulated code signals having a clock offset, generating in said digital demodulator highly accurate digital frequency error signals, converting said digital frequency error signals to phase error signals at known time intervals, calculating said clock offset of the received PN modulated signals by processing said phase error signals, and generating a clock adjustment signal for transmission to a user receiver/transmitter calculated to synchronize the multipoint-to-point communication system.

8. A method of synchronizing a plurality of user receiver/transmitters with a central hub in a multipoint-to-point communications system, comprising the steps of:

generating a unique PN encoded message at a said receiver/transmitter with encoding means, transmitting said unique PN encoded message to said central hub, demodulating said PN encoded message, determining the phase error between said received unique PN encoded message and a reference PN generated code in said central hub, calculating a digital clock adjustment signal for adjusting the phase of said encoding means to reduce said phase error, and transmitting said adjustment signal to said receiver/transmitter so that the phase error of subsequent messages to said central hub from said receiver/transmitter are synchronized with said reference PN generator in said central hub.

9. A method as set forth in claim 8 wherein said multipoint-to-point system comprises a plurality of mobile user receiver/transmitters and said step of generating a unique PN encoded message comprises the steps of:

generating a plurality of unique encoded messages at different user receiver transmitters, and transmitting said unique PN encoded messages to said central hub.

10. A method as set forth in claim 9 wherein said step of calculating a digital clock adjustment signal comprises the steps of calculating a digital clock adjustment signal for each user receiver/transmitter for each unique PN encoded message received at said central hub, wherein said system of mobile receiver/transmitters are continuously synchronized upon activation on said system.

* * * * *